United States Patent
Shibagami et al.

(10) Patent No.: US 8,760,568 B2
(45) Date of Patent: *Jun. 24, 2014

(54) IMAGE PICKUP AND FOCUS DETECTION APPARATUS, CONTROL METHOD, AND STORAGE MEDIUM

(75) Inventors: Genjiro Shibagami, Tokyo (JP); Naoki Iwasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,312

(22) Filed: Jun. 29, 2012

(65) Prior Publication Data

US 2012/0281103 A1    Nov. 8, 2012

Related U.S. Application Data

(63) Continuation of application No. 12/508,932, filed on Jul. 24, 2009, now Pat. No. 8,248,517.

(30) Foreign Application Priority Data

Sep. 9, 2008 (JP) .................................. 2008-230895

(51) Int. Cl.
*H04N 5/232* (2006.01)
*G03B 13/00* (2006.01)

(52) U.S. Cl.
USPC ........................................................ 348/349

(58) Field of Classification Search
USPC ................................................ 348/345, 349
See application file for complete search history.

(56) References Cited

U.S. PATENT DOCUMENTS

| | | | | |
|---|---|---|---|---|
| 5,877,809 A * | 3/1999 | Omata et al. | ................... | 348/345 |
| 7,593,053 B2 * | 9/2009 | Ito et al. | ......................... | 348/348 |
| 7,796,182 B2 * | 9/2010 | Konishi | ......................... | 348/345 |
| 7,916,206 B2 * | 3/2011 | Kikuchi | ......................... | 348/349 |
| 8,049,813 B1 * | 11/2011 | Huang et al. | ................... | 348/349 |
| 8,199,203 B2 * | 6/2012 | Sugimoto | ................ | 348/208.14 |
| 2005/0157198 A1 * | 7/2005 | Larner et al. | ................... | 348/345 |
| 2006/0238641 A1 * | 10/2006 | Konishi | ......................... | 348/349 |

FOREIGN PATENT DOCUMENTS

| | | |
|---|---|---|
| JP | 05-336427 A | 12/1993 |
| JP | 2001-311977 A | 11/2001 |
| JP | 2005-286427 A | 10/2005 |
| JP | 2006-023383 A | 1/2006 |
| JP | 2006-113293 A | 4/2006 |
| JP | 2006-208558 A | 8/2006 |
| JP | 2006-301378 A | 11/2006 |

* cited by examiner

*Primary Examiner* — Gary C Vieaux
(74) *Attorney, Agent, or Firm* — Cowan, Liebowitz & Latman, P.C.

(57) ABSTRACT

An image pickup apparatus capable of achieving in-focus photographing with a reduced time lag. A system controller of the image pickup apparatus detects an in-focus state of image while moving a focus lens in an optical axis direction, and detects a state of a photographing scene at image acquisition. When detecting a change in photographing scene, the system controller moves the focus lens to a movement start position. When detecting that a photographing scene has been decided by a photographer, the controller detects an in-focus state while moving the focus lens.

29 Claims, 11 Drawing Sheets

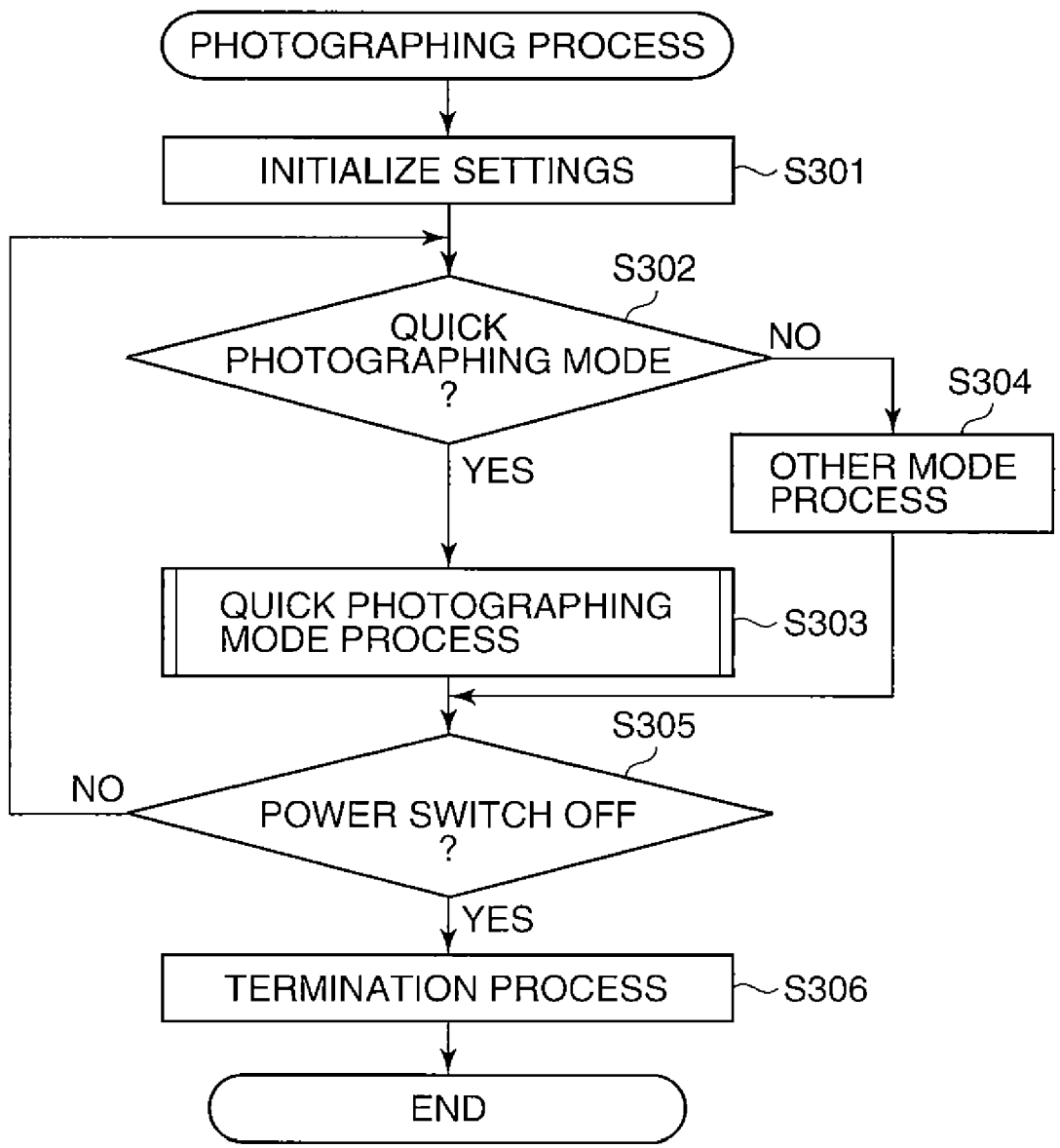

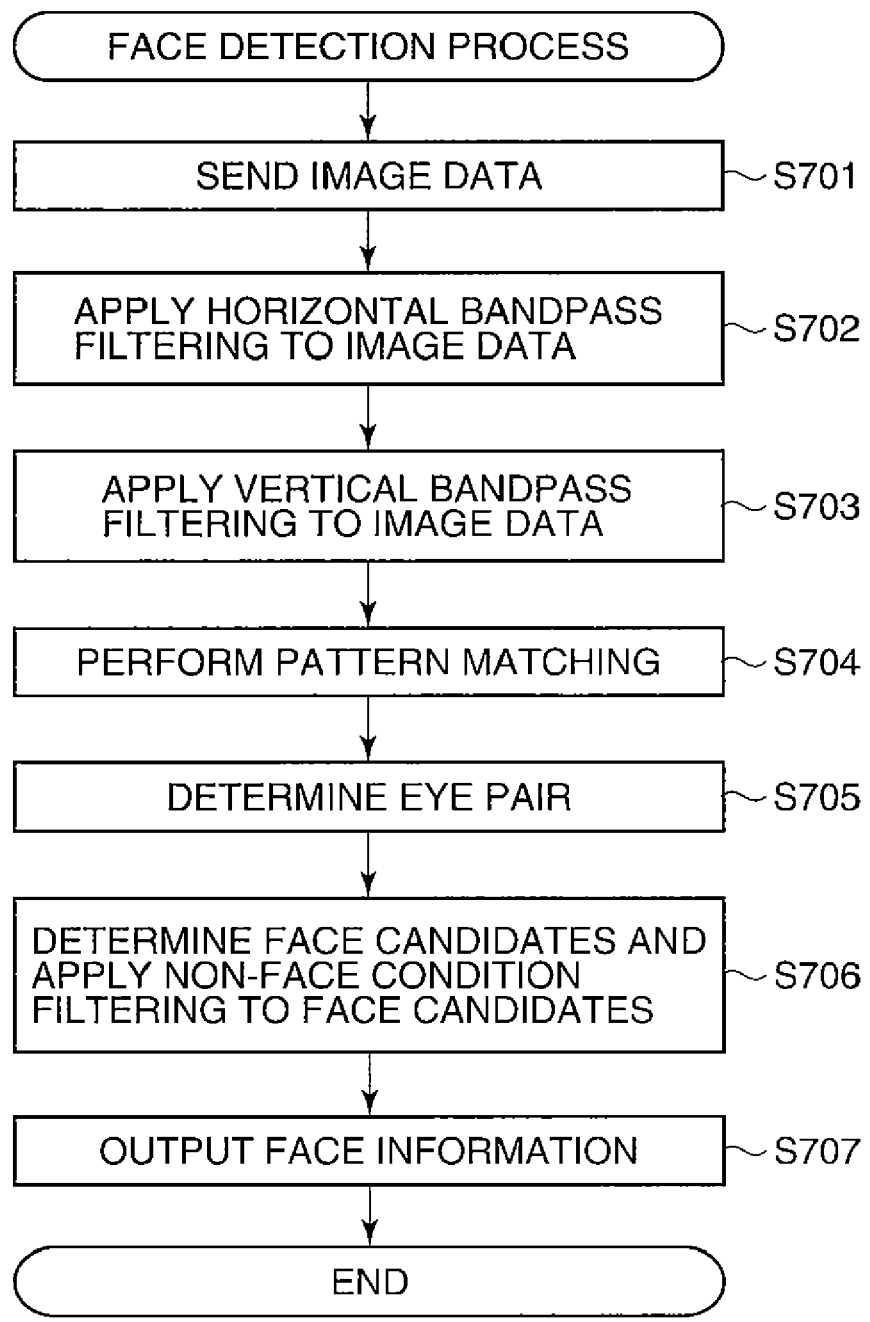

IMAGE PICKUP AND FOCUS DETECTION APPARATUS, CONTROL METHOD, AND STORAGE MEDIUM

CROSS-REFERENCE TO RELATED APPLICATION

This application is a continuation of application Ser. No. 12/508,932, filed Jul. 24, 2009, the entire disclosure of which is hereby incorporated by reference.

BACKGROUND OF THE INVENTION

1. Field of the Invention

The present invention relates to an image pickup apparatus that determines a scene-dependent in-focus position while being on standby for photographing, and relates to a control method for the image pickup apparatus and a storage medium storing a program therefor.

2. Description of the Related Art

To reduce a time lag in execution of photographing, a recent digital camera (image pickup apparatus) has a continuous AF function for displaying a through-image on an image display and continuously performing AF (auto-focus) for focus adjustment, while being on standby for photographing.

The continuous AF function is advantageous in that framing can easily be performed by continuous focusing and in that, if an in-focus position has been attained when or before a release button is depressed, a time lag can be reduced by scanning over a predetermined range from the in-focus position.

There has also been proposed a technique for reducing a time lag by determining a scene and by determining a scanning direction to restrict a scan range based on the determined scene (see, for example, Japanese Laid-open Patent Publication No. 2006-023383). Another proposed technique reduces a time lag by restricting a photographing condition so as to correspond to a selected one of scenes set in advance in an image pickup apparatus (see, for example, Japanese Laid-open Patent Publication No. 2001-311977).

However, with the continuous AF function adapted to first maintain the visual quality of a through-image, the entire scene is not scanned, even if a scene change takes place. When the release button is depressed immediately after a scene change, therefore, the entire scene must be scanned, resulting in a longtime lag which poses a problem.

With the technique disclosed in Japanese Laid-open Patent Publication No. 2006-023383, in which the focus lens is driven from its stop position to a direction decided according to the determined scene, a problem is posed that a time lag is much prolonged, if the in-focus position is on the side opposite from the focus-lens driving direction with respect to the lens stop position.

With the technique disclosed in Japanese Laid-open Patent Publication No. 2001-311977 in which the in-focus position at photographing is fixed, a problem is posed that satisfactory focusing cannot be achieved depending on object state.

SUMMARY OF THE INVENTION

The present invention provides an image pickup apparatus capable of achieving in-focus photographing with a reduced time lag, and provides a control method for the image pickup apparatus and a storage medium storing a program for execution of the control method.

According to a first aspect of this invention, there is provided an image pickup apparatus, which comprises an image pickup unit adapted to acquire an image by photoelectric conversion of an object image formed by a focus lens, a focus detection unit adapted to detect an in-focus state of the image while moving the focus lens in an optical axis direction, and a state detection unit adapted to detect a state of a photographing scene at acquisition of the image, wherein the focus detection unit is adapted to move the focus lens to a movement start position in a case where the state detection unit detects a photographing scene change, and wherein the focus detection unit is adapted to detect an in-focus state while moving the focus lens in a case where the state detection unit detects that a photographing scene has been decided.

According to a second aspect of this invention, there is provided a control method, which comprises an image pickup step of acquiring an image by photoelectric conversion of an object image formed by a focus lens, a focus detection step of detecting an in-focus state of the image while moving the focus lens in an optical axis direction, and a state detection step of detecting a state of a photographing scene at acquisition of the image, wherein the focus lens is moved to a movement start position in the focus detection step in a case where a photographing scene change is detected in the state detection step and wherein an in-focus state is detected while moving the focus lens in the focus detection step in a case where it is detected in the state detection step that a photographing scene has been decided.

According to a third aspect of this invention, there is provided a computer-readable storage medium storing a program for causing a computer to execute the control method according to the second aspect of this invention.

The present invention makes it possible to achieve in-focus photographing, with a reduced time lag.

Further features of the present invention will become apparent from the following description of an exemplary embodiment with reference to the attached drawings.

BRIEF DESCRIPTION OF THE DRAWINGS

FIG. 3 is a flowchart showing the procedures of a photographing process performed by the digital camera;

FIG. 7 is a flowchart showing the procedures of a face detection process performed in step S513 in FIG. 5B and step S600 in FIG. 6A.

DETAILED DESCRIPTION OF THE PREFERRED EMBODIMENT

The present invention will now be described in detail below with reference to the drawings showing a preferred embodiment thereof.

Figure 1:
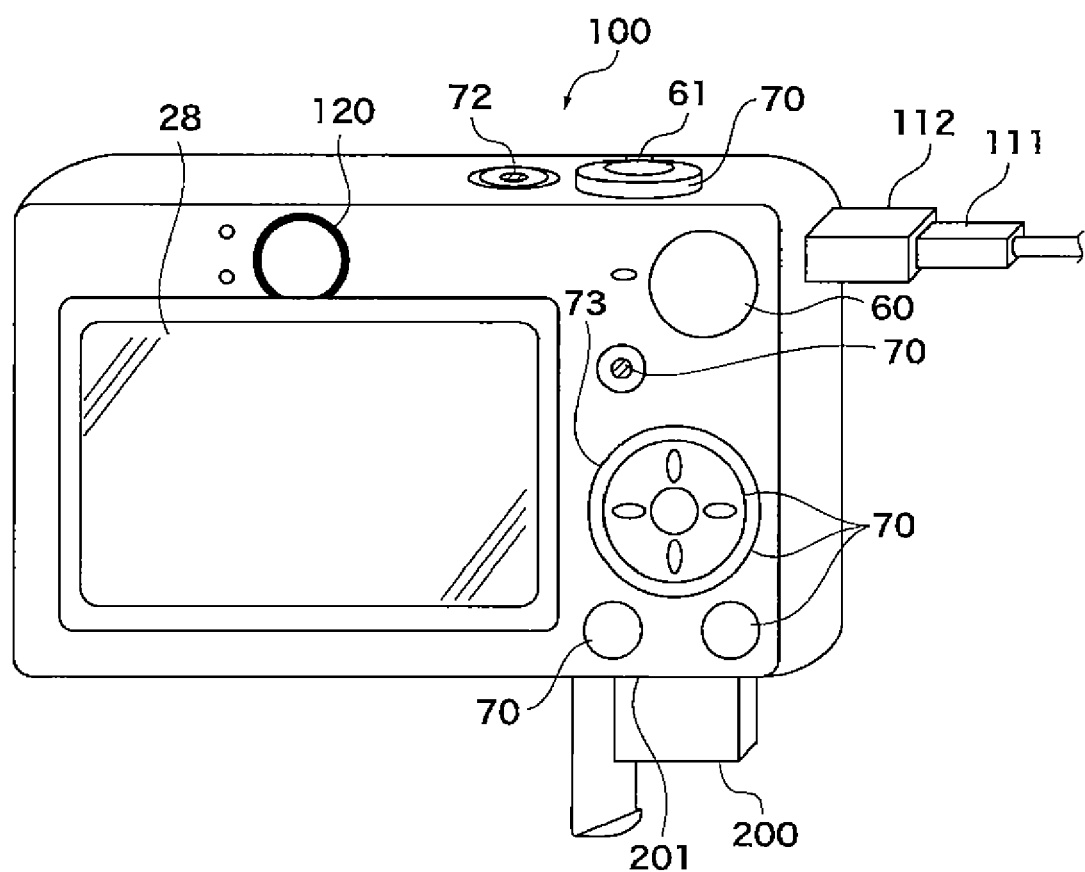
FIG. 1 is a perspective view showing the external appearance of a digital camera as an image pickup apparatus according to one embodiment of this invention.

FIG. 1 shows in perspective view the external appearance of a digital camera as an image pickup apparatus according to one embodiment of this invention.

As shown in FIG. 1, a digital camera 100 includes an image display 28 on which an image and various information are displayed, an optical finder 120, a power switch 72 for turning on/off the power, a shutter switch 61, a mode switching button 60 for mode switching.

The digital camera 100 further includes a connection cable 111 for connection of external equipment, a connector 112 for connection between the connection cable 111 and the digital camera 100, an operating unit 70 manipulated by a user.

The operating unit 70 includes operating members such as buttons and a touch panel. For example, the operating members include an erase button, menu button, SET button, cross four-direction button (upward, downward, rightward and leftward buttons), wheel 73, etc.

A recording medium 200 is implemented by a memory card, hard disk, or the like. A recording medium slot 201 is adapted to receive the recording medium 200.

Figure 2:
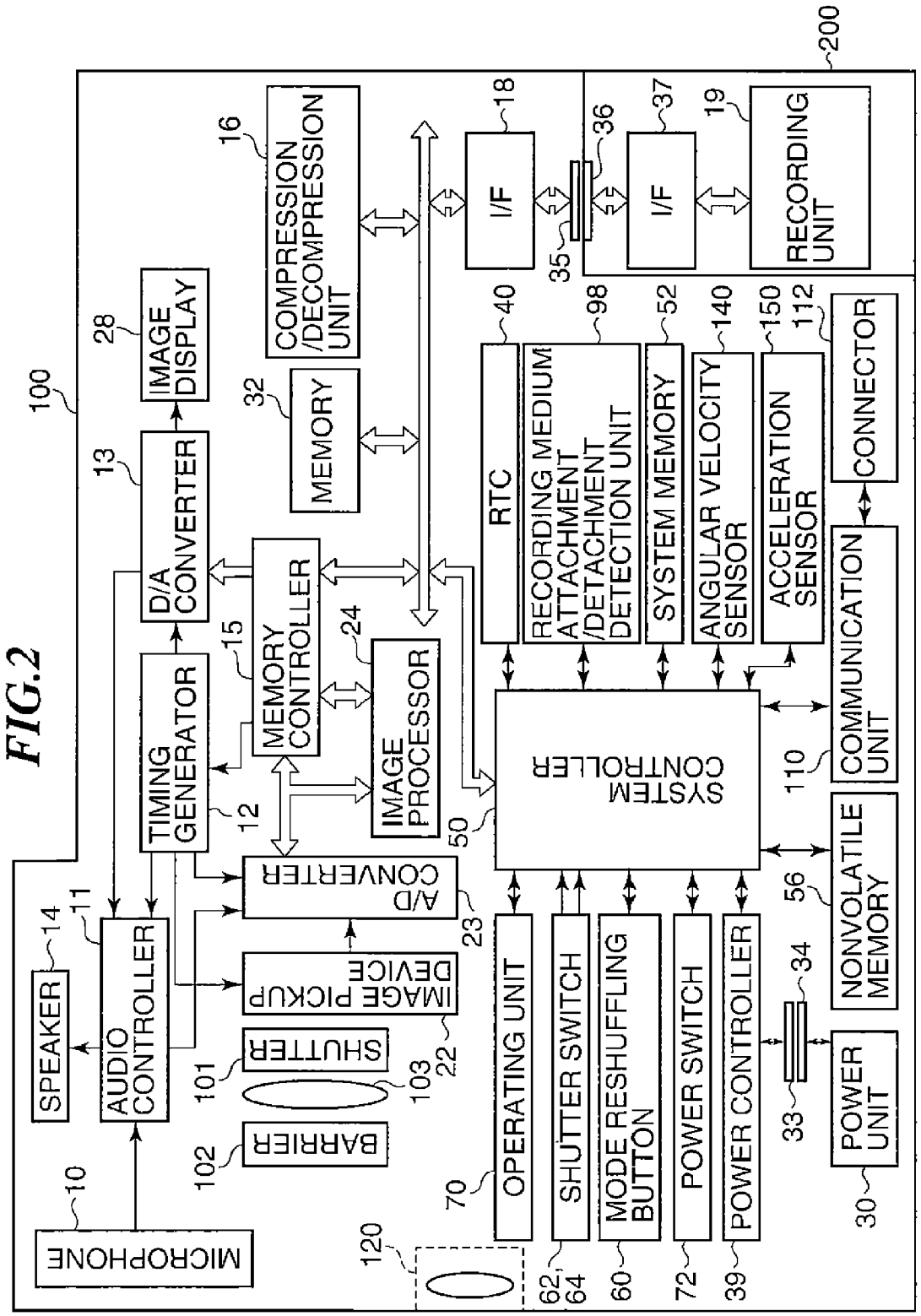
FIG. 2 is a block diagram showing an example construction of the digital camera shown in FIG. 1.

FIG. 2 shows in block diagram an example construction of the digital camera 100.

As shown in FIG. 2, the digital camera 100 includes a shutter 101 having an aperture function, a taking lens (including a focus lens) 103, and the following units.

An image pickup device 22 is implemented by a CCD, CMOS device, or the like for converting an optical image into an electrical signal, and functions as an image pickup unit that acquires an image by photoelectric conversion of an object image formed by the focus lens.

An A/D converter 23 for analog-to-digital signal conversion is used to convert an analog signal output from the image pickup device 22 or an audio controller 11 into a digital signal.

A barrier 102 is adapted to cover the taking lens 103 and the image pickup device 22 for prevention of contamination and damage of the lens 103 and the device 22. The optical finder 120 enables the user to determine the photographing composition without having an image displayed on the image display 28.

Under the control of a memory controller 15 and a system controller 50, a timing generator 12 supplies a clock signal and a control signal to the image pickup device 22, audio controller 11, A/D converter 23, and D/A converter 13.

An image processor 24 performs color conversion processing and resizing processing such as pixel interpolation and reduction on data from the A/D converter 23 or the memory controller 15, and performs predetermined calculations based on picked-up image data. Based on calculation results, the system controller 50 carries out exposure control and range control.

TTL-AF (through-the-lens auto-focus) processing, AE (automatic exposure) processing, and EF (electronic flash) processing are thereby performed. The AF processing is carried out by using an AF evaluation value.

The AF evaluation value is obtained by the image processor 24 by extracting a high-frequency component of image data from the A/D converter 23 and by integrating the absolute value of the high-frequency component over a predetermined area.

The image processor 24 performs predetermined calculation using picked-up image data, and performs TTL AWB (auto-white balance) processing based on a calculation result.

Output data from the A/D converter 23 is written into a memory 32 via the image processor 24 and the memory controller 15 or via the controller 15.

The memory 32 stores audio data, file header of image file, still image, and moving image. To this end, the memory 32 has its storage capacity large enough to store a desired number of still images and/or a moving image of predetermined time length and/or audio data of predetermined time length.

A compression/decompression unit 16 adapted to compress/decompress image data by ADCT (adapted discrete cosine transform) is triggered by the shutter 101 to read picked-up image stored in the memory 32, performs compression processing on the read image, and writes the compressed image into the memory 32.

The compression/decompression unit 16 reads compressed image read into the memory 32 from a recording unit 19 or the like, performs decompression processing on the read data, and writes the decompressed data into the memory 32. The image data written into the memory 32 by the unit 16 is converted into a file by a file unit of the system controller 50 and the resultant file is sent via an interface (I/F) 18 to the recording medium 200 and recorded therein.

The memory 32 also functions as an image display memory. Image data for display written into the memory 32 is sent via the D/A converter 13 to the image display 28 and displayed by the display 28.

An audio signal output from a microphone 10 is sent to the A/D converter 23 via the audio controller 11, which is implemented by, e.g., an amplifier. The A/D converter 23 converts the audio signal into a digital signal, which is then stored into the memory 32 under the control of the memory controller 15.

Audio signal data recorded in the recording medium 200 is read into the memory 32, is sent via the D/A converter 13 to the audio controller 11, and is sounded by a speaker 14.

A nonvolatile memory 56 is implemented by an electrically erasable and recordable memory, e.g., an EEPROM, in which constants, programs, etc. for operation of the system controller 50 are stored.

The system controller 50 controls the entire digital camera 100. A system memory 52 is used to develop the constants, variables for operation of the system controller 50 and programs, etc. read from the nonvolatile memory 56.

A first shutter switch 62, a second shutter switch 64, and the operating unit 70 constitute an operation unit for inputting operation instructions to the system controller 50.

By manipulating the mode switching button 60, the operation mode can be changed between a still image recording mode, moving image recording mode, reproduction mode, etc.

When the shutter switch 61 of the camera 100 is operated halfway (half-pressed), the first shutter switch 62 is switched on to give an instruction to start the AF processing, AE processing, AWB process, EF processing, etc.

When the shutter switch 61 is fully operated (fully pressed), the second shutter switch 64 is switched on to instruct to start the operation of a series of image pickup process from the reading of signal from the image pickup device 22 to the writing of image data into the recording medium 200.

By selectively manipulating function icons displayed on the image display 28, functions suitable for scene are assigned to the operating members of the operating unit 70, whereby these operating members act as function buttons.

The function buttons include, e.g., an end button, return button, image shift button, jump button, aperture step-down button, attribute change button, etc. When a menu button is depressed, a menu screen for various settings is displayed on the image display 28. The user (photographer) is able to intuitively carry out settings by using the menu screen displayed on the display 28, the four-direction button, and the SET button.

The power switch 72 is for turning on/off the power. A power controller 39 includes a battery detection circuit, a DC-DC converter, a switch circuit for selecting a block to be supplied with power, etc., and detects battery attachment/detachment, battery type, battery residual capacity.

In accordance with a result of detection and an instruction from the system controller 50, the power controller 39 controls the DC-DC converter so as to supply desired voltages to various parts, including the recording medium 200, for desired time periods.

A power unit 30 is implemented by a primary battery such as an alkaline battery or a lithium battery, or a secondary battery such as a NiCd battery, NiMH battery, or Li battery, or an AC adapter, for example. The power unit 30 and the power controller 39 are connected by connectors 33, 34.

An RTC (real time clock) 40 has a power unit incorporated therein and is able to count time even if the power unit 30 is turned off. The system controller 50 carries out time control using the date and time acquired from the RTC 40 at start-up.

The system controller 50 carries out anti-shake control based on angular velocity information on the camera acquired from an angular velocity sensor 140. The angular velocity information can also be used to determine a camera movement caused by the user.

Based on acceleration information on the camera acquired from an acceleration sensor 150, the system controller 50 determines how the camera is operated by the user and determines whether the camera is falling, and so on.

A connector 35 that connects recording medium 200 with the interface 18 is provided. A recording medium attachment/detachment detection unit 98 detects whether the recording medium 200 is connected with the connector 35.

The recording medium 200 includes a recording unit 19, an interface (I/F) 37 with the digital camera 100, and a connector 36 that connects the recording medium 200 with the camera 100.

A communication unit 110 is able to perform communication processing based on RS232C, USB, IEEE 1394, P1284, SCSI, modem, LAN, wireless communication, or the like.

A connector (antenna for a case of wireless communication) 112 connects external equipment with the communication unit 110.

(Overall Process)

FIG. 3 shows in flowchart the procedures of a photographing process carried out by the system controller 50 of the digital camera 100.

Referring to FIG. 3, when the power switch 72 is operated to turn on the power, the system controller 50 initializes flags, control variables, etc. (step S301), and determines whether a quick photographing mode is set by the mode switching button 60 (step S302).

If it is determined in step S302 that the quick photographing mode is set, the process proceeds to a quick photographing mode process described later with reference to FIGS. 4A and 4B (step S303). If other mode is set, the controller 50 proceeds to step S304 to carryout other mode process corresponding to the mode selected by the mode switching button 60, and then proceeds to step S305.

As the other mode process, there is a still image photographing mode process, a moving image photographing process, an image reproduction mode process, or the like.

In step S305, the system controller 50 determines whether the power switch 72 is at a power-off position. If the power switch 72 is set at a power-on position, the controller 50 returns to step S302. On the other hand, if the power switch 72 is set at the power-off position, the controller 50 proceeds to step S306 to perform a termination process.

In the termination process, a display on the image display 28 is changed to a photographing end indication, the barrier 102 is closed for protection of the image pickup device 22, parameters including flags, control variables, etc., setting values, and setting mode are stored into the nonvolatile memory 56, and unnecessary power supply is shut off. The photographing process is completed upon completion of the termination process.

(Quick Photographing Mode Process)

Figure 4A:
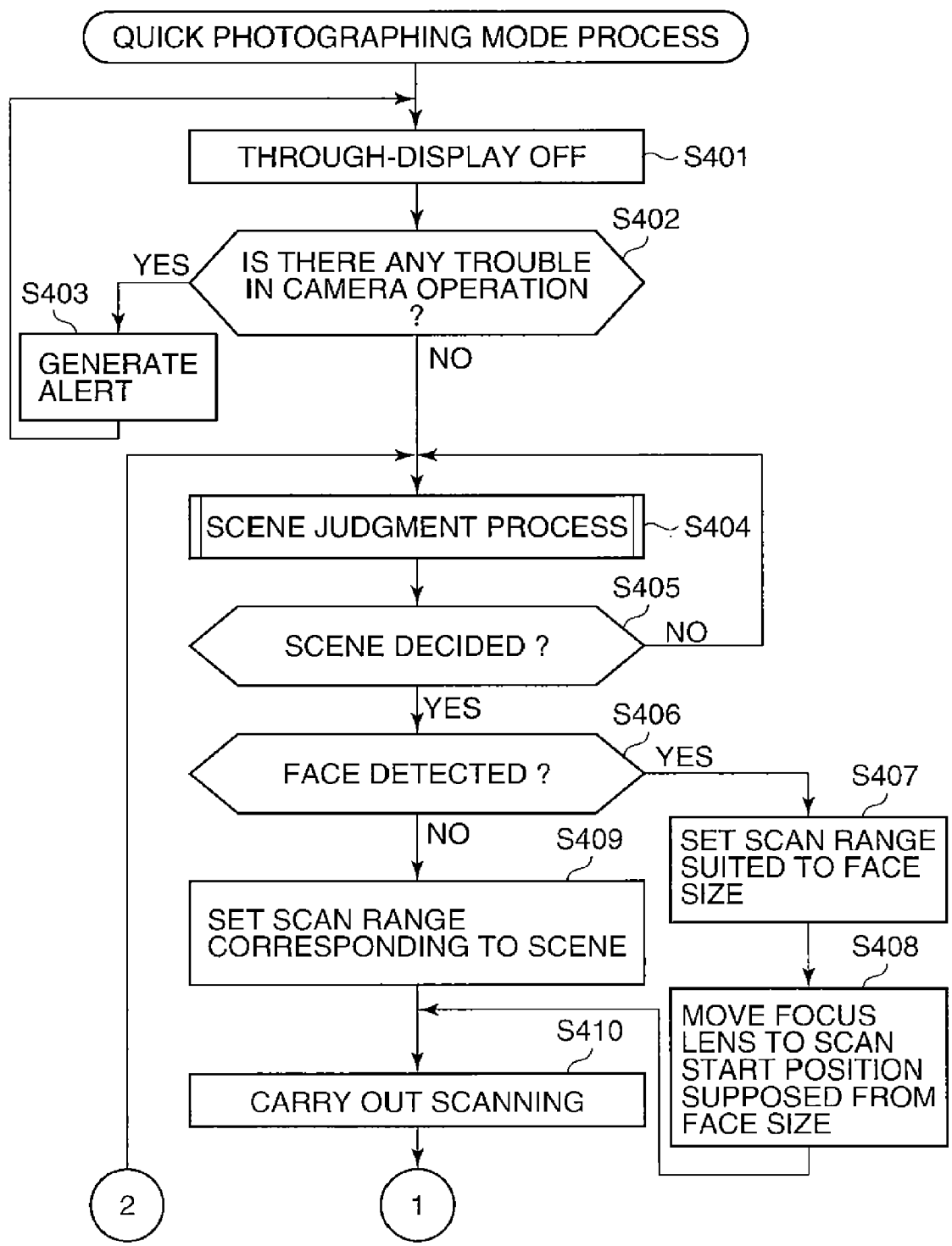
FIGS. 4A and 4B are a flowchart showing a quick photographing mode process executed in step S303 in FIG. 3.
Figure 4B:
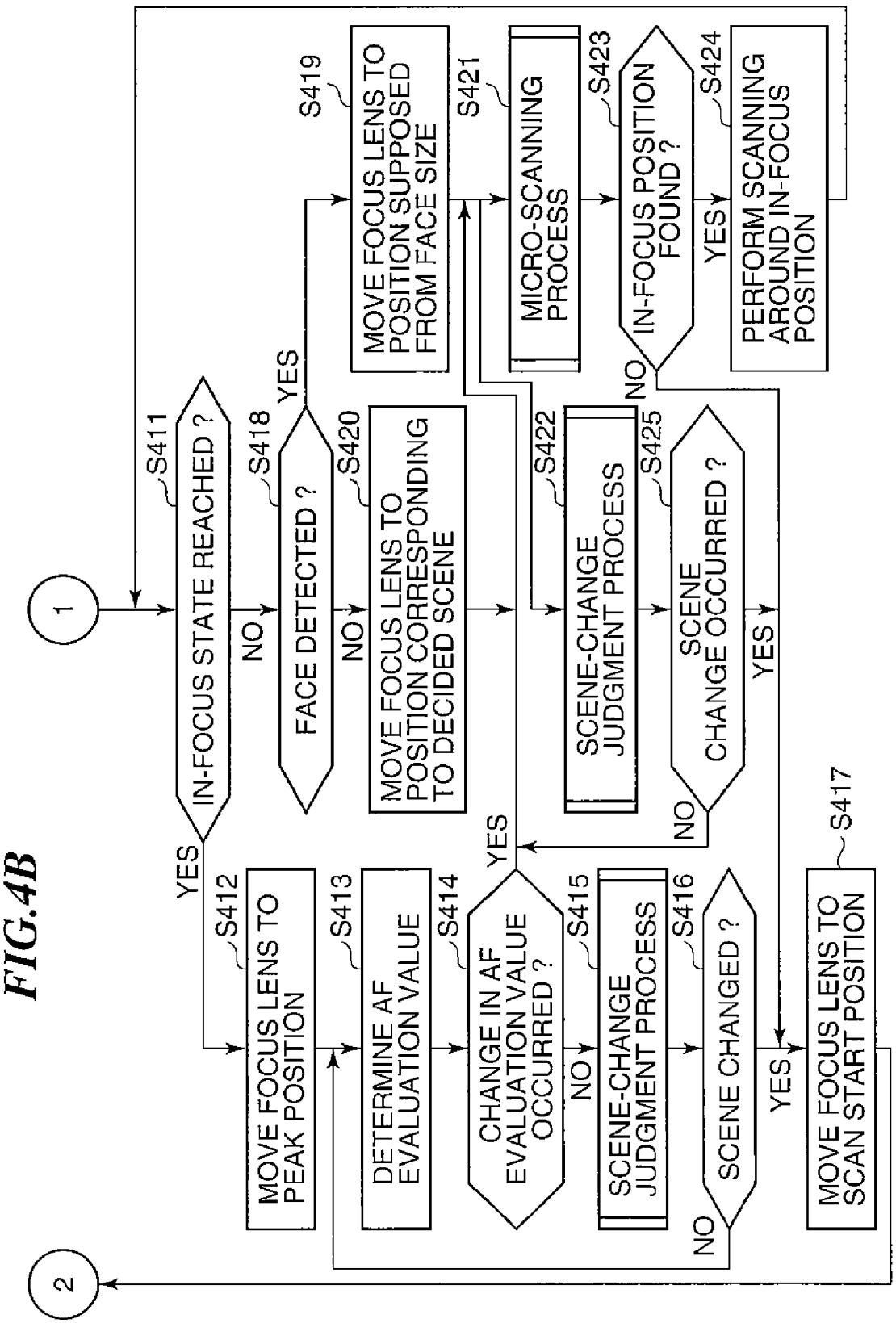

FIGS. 4A and 4B show in flowchart the procedures of the quick photographing mode process executed in step S303 in FIG. 3.

Referring to FIGS. 4A and 4B, at start of the quick photographing mode process, the system controller 50 sets the image display 28 in a through-display off state (step S401), and displays an indication to prompt the user to use the optical finder 120.

In the through-display off state, a through display is not made so that image data from the image pickup device 22 is not displayed on the image display 28. It is therefore possible to achieve immediate AF, while preventing an occurrence of image blurring by a large motion of the focus lens and preventing an occurrence of smear viewed by the user at exposure suited to continuous AF.

During the quick photographing mode process, the AE control to automatically control exposure to attain exposure suitable for AF and the AWB control to maintain the desired white balance are carried out concurrently with the AF processing.

Next, based on the residual capacity of the battery of the power unit 30 detected by the power controller 39 and the presence/absence of and residual capacity of the recording medium 200, the system controller 50 determines whether there is any trouble in the operation of the digital camera 100 (step S402). If there is a shortage of the residual capacity of battery or recording medium or any other trouble, the controller 50 provides a visual or audio alert by using the image display 28 or the speaker 14 (step S403), and returns to step S401.

If it is determined in step S402 that there is no trouble in the operation of the camera 100, the system controller 50 carries out a scene judgment process, described later with reference to FIGS. 5A and 5B (step S404). Based on information written into the system memory 52 and representing a result of the scene judgment process, the controller 50 determines whether a scene to be shot has been decided by the user (step S405).

If it is determined in step S405 that a scene to be shot has not been decided as yet, the controller 50 returns to the scene judgment process in step S404.

On the other hand, if it is determined in step S405 that a scene to be shot has been decided, the system controller 50 determines whether a face has been detected in a face detection process, described later with reference to FIG. 7 (step S406).

If it is determined in step S406 that a face has been detected, the system controller 50 sets a scan range suited to a face size detected in the face detection process (step S407). Specifically, a distance between the object face and the camera 100 is estimated based on the face size by a method described later with reference to FIG. 7. Then, a predetermined distance range around the estimated distance is set as the scan range.

Next, the system controller 50 moves the focus lens to a scan start position supposed from the face size detected in the face detection process (step S408). In a case that the scanning is made from the tele-side of the scan range, the focus lens is moved to the tele-side end of the scan range. In a case that the scanning is made from the near-side of the scan range, the focus lens is moved to the near-side end of the scan range.

On the other hand, if it is determined in step S406 that a face has not been detected, the system controller 50 estimates a distance between the object and the camera 100 based on the scene determined to have been decided by the user from the result of the scene judgment process, and sets a scan range corresponding to the scene based on the estimated distance (step S409). For example, if it is determined that the scene is a long-distance view, a distance range around an estimated long distance is set as the scan range. Then, a scan start position is set within the scan range, and the focus lens is moved to the scan start position.

Next, the system controller 50 carries out the scanning over the scan range set in step S407 or S409 (step S410).

In the scanning, an AF evaluation value is acquired while moving the focus lens, and a focus lens position where the AF evaluation value has its local maximal value, i.e., in-focus position, is detected. If the depth of field is deep, it is hard to attain the local maximal value. To obviate this, the scanning is made in a state where the aperture is made open, i.e., the depth of field is shallow.

Next, the system controller 50 determines whether an in-focus state has been reached (step S411). It is determined that an in-focus state has been reached, if there are satisfied determination conditions that the AF evaluation value has its local maximal value in the scan range, the local maximal value is equal to or larger than a predetermined evaluation value, AF evaluation values around the local maximal value are each smaller by at least a predetermined value than the local maximum value, and so on.

If it is determined in step S411 that an in-focus state has been reached, the system controller 50 moves the focus lens to a peak position (in-focus position) corresponding to the local maximal value of the AF evaluation value (step S412). Then, the controller 50 determines an AF evaluation value at the in-focus position (step S413), and confirms whether a change in the AF evaluation value has occurred between preceding and current in-focus positions (step S414).

If it is determined in step S414 that a change in the AF evaluation value has occurred, the system controller 50 starts execution of a micro-scanning process described later with reference to FIG. 8 (step S421).

In a case that the change in the AF evaluation value is small, there is a high possibility that an in-focus state can be attained again by executing micro-scanning, making it possible to reduce the number of execution times of scanning, whereby power-saving effect can be achieved.

On the other hand, if it is determined in step S414 that a change in the AF evaluation value has not occurred, the system controller 50 carries out a scene-change judgment process described later with reference to FIG. 6 (step S415). Based on information representing a result of the scene-change judgment process and written in the system memory 52, the controller 50 determines whether the scene has been changed (step S416).

If it is determined in step S416 that the scene has been changed, the system controller 50 moves the focus lens to a scan start position (step S417), and returns to the scene judgment process in step S404.

In this embodiment where the scanning is carried out from the tele side, the focus lens is moved to a super infinite position in step S417. The focus lens may be moved to a super near position, if the scanning is made from the near side. Whether scanning should be performed from the tele side or near side is determined depending on the lens unit construction, etc.

By moving the focus lens to the scan start position in advance, the scanning to be made immediately after the scene has been decided can be carried out with a reduced time lag.

If it is determined in step S411 that an in-focus state has not been reached, the system controller 50 determines whether a face has been detected (step S418). If a face has been detected, the controller 50 moves the focus lens to a position where the focus lens is able to focus on an object at a distance supposed from a detected face size (step S419).

On the other hand, if it is determined in step S418 that no face has been detected, the system controller 50 moves the focus lens to a position where the lens is able to focus on an object at a distance corresponding to the decided scene (step S420). When, for example, the decided scene is a landscape, the focus lens is moved to a nearest position where infinite distance is included in the depth of field.

Next, the system controller 50 starts execution of a micro-scanning process described later with reference to FIG. 8 (step S421), and at the same time carries out a scene-change judgment process described later with reference to FIGS. 6A and 6B (step S422).

Next, the system controller 50 determines whether an in-focus position has been found in the micro-scanning process (step S423). If an in-focus position has not been found (for example, if the focus lens has reached its movable limit position without detecting an in-focus position), the controller 50 moves the focus lens to a scan start position (step S417).

On the other hand, if it is determined in step S423 that an in-focus position has been found, the system controller 50 sets an area around the in-focus position as a scan range and performs scanning in that range (step S424), and returns to step S411 to determine whether an in-focus state has been reached.

Based on information representing a result of the scene-change judgment process and written in the system memory 52, the system controller 50 determines whether a scene change has occurred (step S425). If a scene change has not occurred, the controller 50 returns to the scene-change judgment process in step S422. If it is determined that a scene change has occurred, the controller 50 moves the focus lens to a scan start position (step S417).

After the focus lens is moved to the scan start position, the aperture is reduced, whereby the depth of field is made deep and an object can easily be detected.

The system controller 50 and steps S410, S411 and S417 function as a focus detection unit for detecting an in-focus state of image while moving the focus lens in an optical axis direction.

The system controller 50 and steps S404, S415 and S416 function as a state detection unit for detecting a state of photographing scene at image acquisition.

The focus detection unit moves the focus lens to a movement start position when a photographing scene change has been detected by the state detection unit, and detects an in-focus state while moving the focus lens when it is detected that the photographing scene has been decided.

The system controller 50 and step S406 function as an object detection unit for detecting from an image an object to be focused.

In a case where it is detected by the state detection unit that the photographing scene has been decided, the focus detection unit detects an in-focus state while moving the focus lens, and thereafter repeats an operation of detecting an in-focus state while minutely moving the focus lens.

A threshold value for use by the state detection unit to determine that the photographing scene has been changed is different from a threshold value for use by the state detection unit to determine that the photographing scene has been decided. By using the different threshold values, occurrences of a frequent change between scene change judgment and scene decision judgment based on threshold value can be prevented.

(Scene Judgment Process)

Figure 5A:
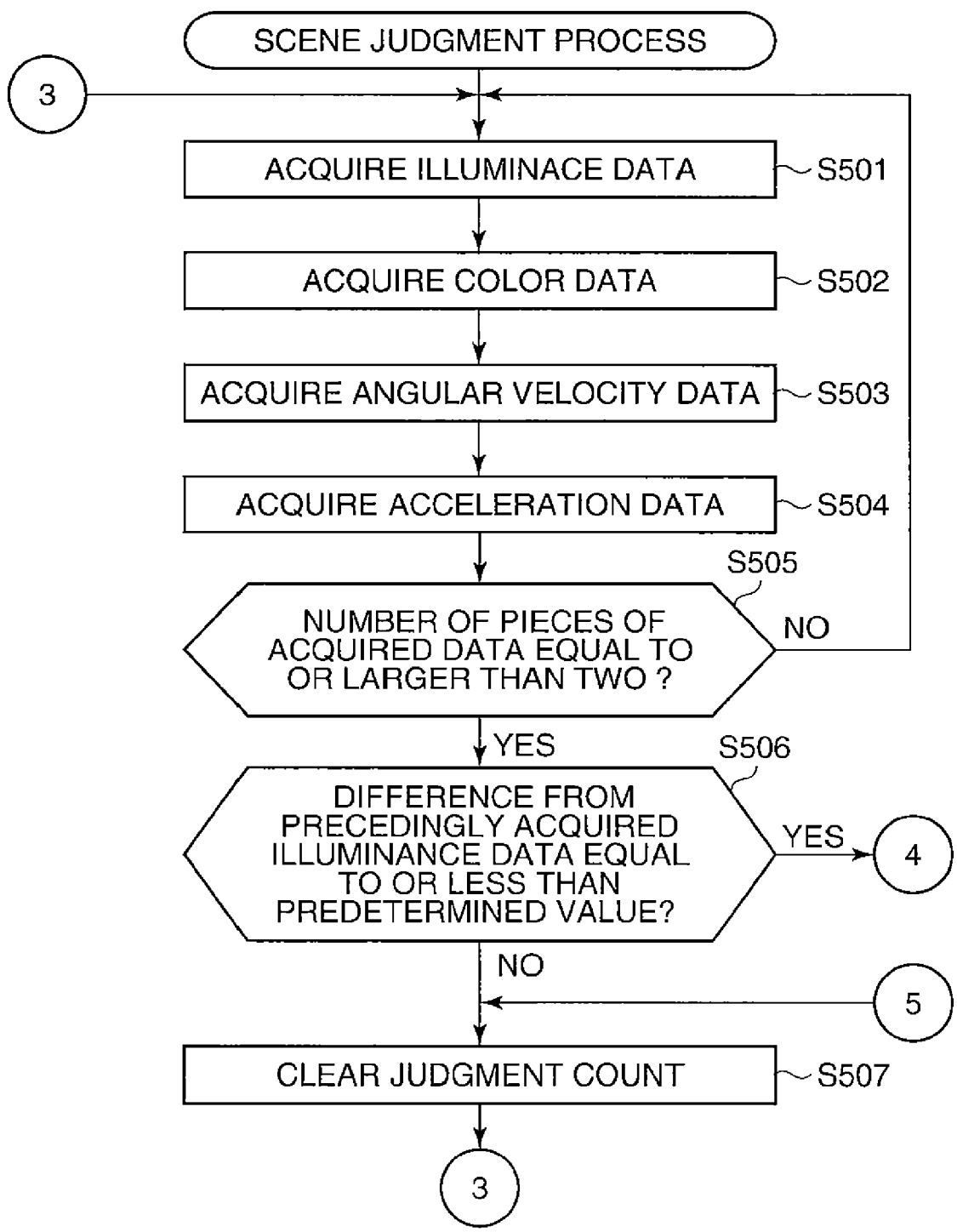
FIGS. 5A and 5B are a flowchart showing the procedures of a scene judgment process performed in step S404 in FIG. 4A.
Figure 5B:
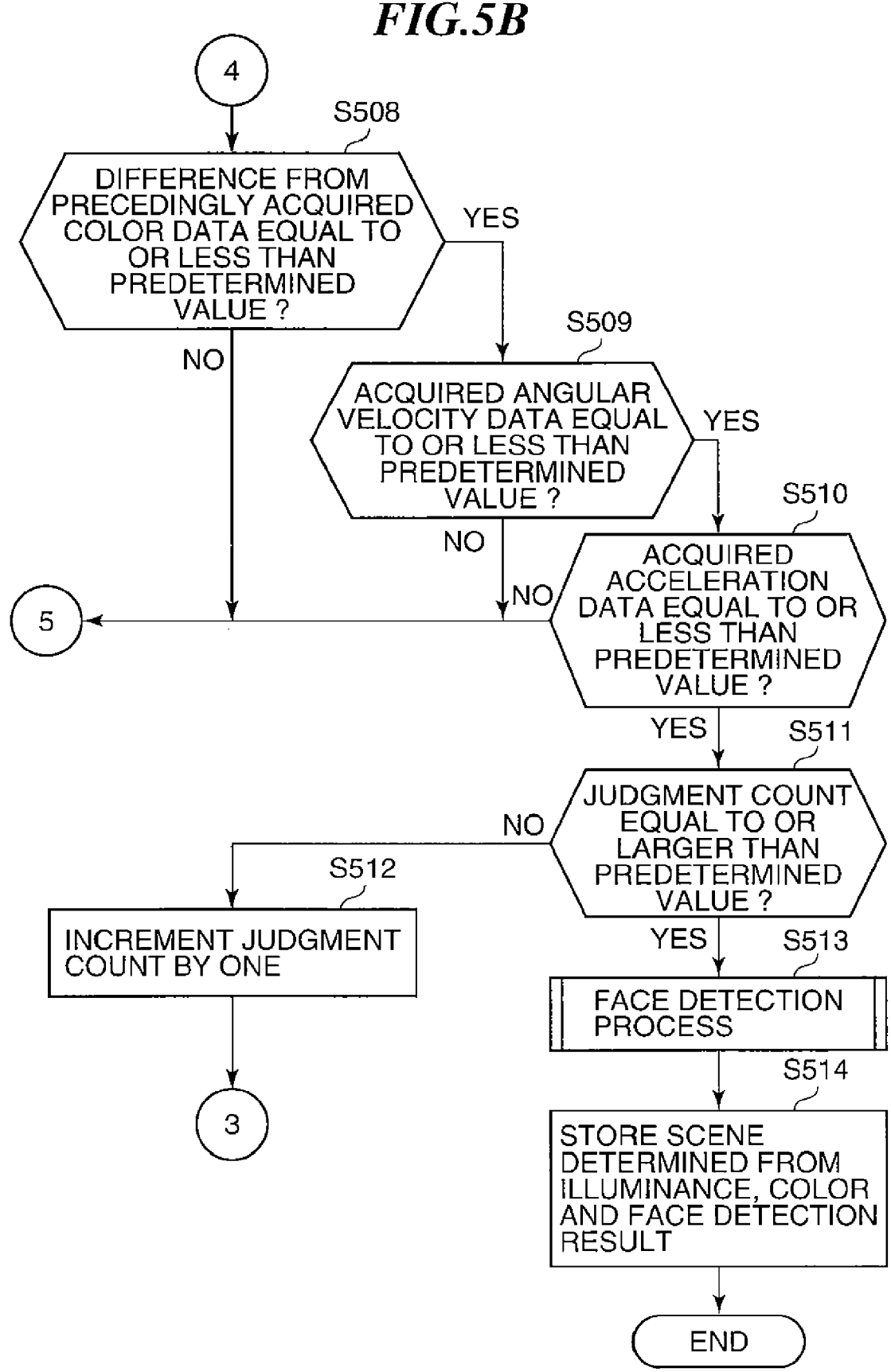

FIGS. 5A and 5B show in flowchart the procedures of the scene judgment process executed in step S404 in FIG. 4A.

Referring to FIGS. 5A and 5B, the system controller 50 acquires illuminance data on an picked-up image from image data thereof (step S501), and acquires color data on the image from the image data (step S502).

Next, the controller 50 acquires the angular velocity (data) of the camera 100 from the angular velocity sensor 140 (step S503), and acquires the acceleration (data) of the camera 100 from the acceleration sensor 150 (step S504).

Next, the system controller 50 determines whether the number of pieces of acquired data is equal to or larger than two (step S505). If the number of piece of acquired data is not equal to or larger than two, the controller 50 returns to step S501 to acquire illuminance data on the next image.

If two or more pieces of data have been acquired, the system controller 50 determines whether a difference between precedingly acquired illuminance data and currently acquired illuminance data is equal to or less than a predetermined value (step S506).

If the difference between illuminance data is not equal to or less than the predetermined value, the system controller 50 clears a judgment count (step S507), and returns to step S501. On the other hand, if the illuminance data difference is equal to or less than the predetermined value, the controller 50 determines whether a difference between precedingly acquired color data and currently acquired color data is equal to or less than a predetermined value (step S508).

If the color data difference is not equal to or less than the predetermined value, the system controller 50 clears the judgment count (step S507) and returns to step S501. On the other hand, if the color data difference is equal to or less than the predetermined value, the controller 50 determines whether acquired angular velocity data is equal to or less than a predetermined value (step S509).

If the angular velocity data is larger than the predetermined value, the system controller 50 clears a judgment count (step S507) and returns to step S501. If the angular velocity data is equal to or less than the predetermined value, the controller 50 determines whether acceleration data is equal to or less than a predetermined value (step S510).

If the acceleration data is larger than the predetermined value, the system controller 50 clears the judgment count (step S507) and returns to step S501. If the acceleration data is equal to or smaller than the predetermined value, the controller 50 determines whether the judgment count is equal to or larger than a predetermined value (step S511).

If the judgment count is not equal to or larger than the predetermined value, the system controller 50 increments the judgment count by one (step S512) and returns to step S501. If the judgment count is equal to or larger than the predetermined value, the controller 50 carries out a face detection process described later with reference to FIG. 7 (step S513).

Next, based on the decided illuminance information, color information, and face detection result, the system controller 50 determines a scene and stores information representing the determined scene in the system memory 52 (step S514). For example, if the image is shown in bright green color and if no face has been detected, the scene is determined as a landscape scene.

(Scene-Change Judgment Process)

Figure 6A:
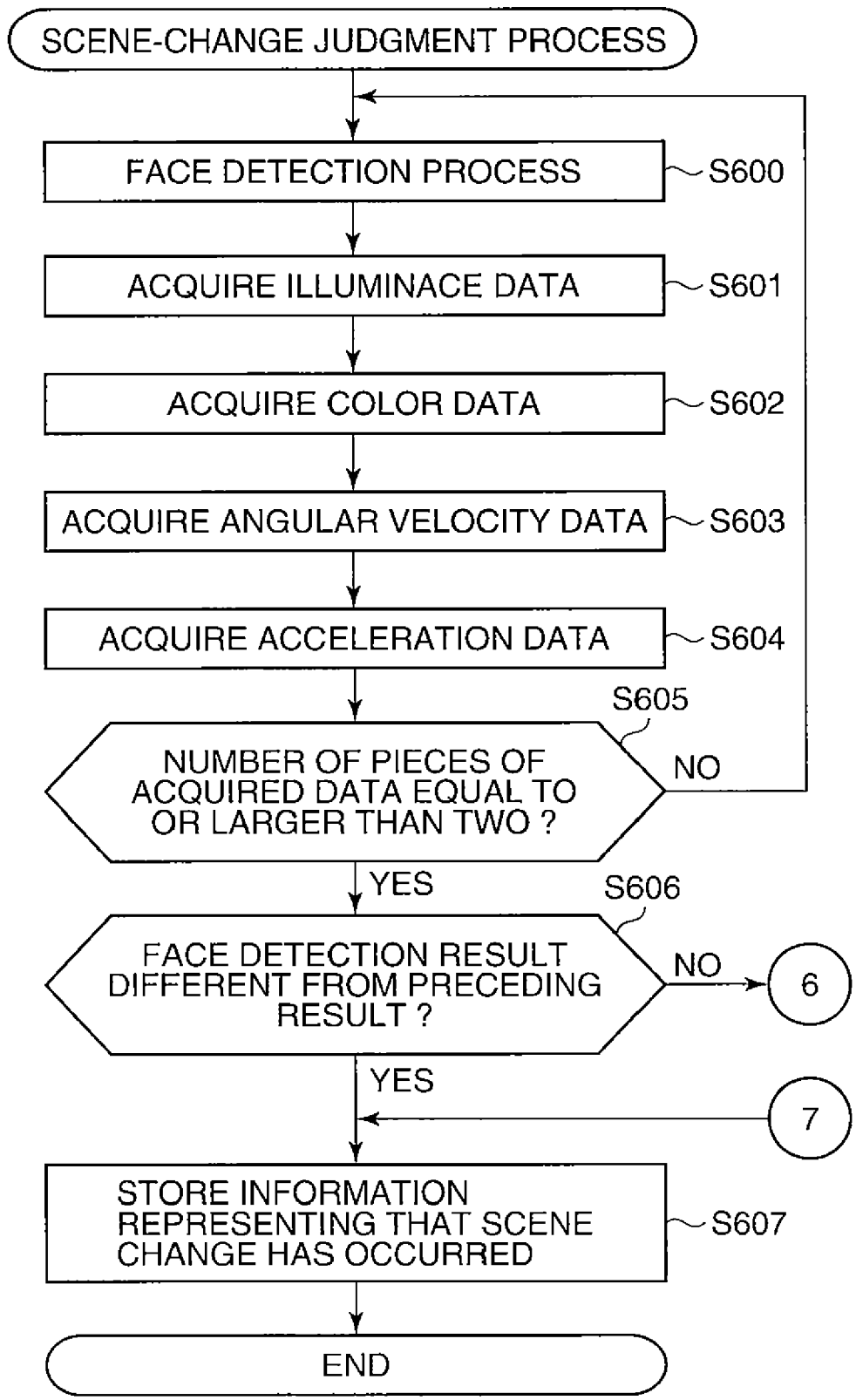
FIGS. 6A and 6B are a flowchart showing the procedures of a scene-change judgment process performed in steps S415 and S422 in FIG. 4B.
Figure 6B:
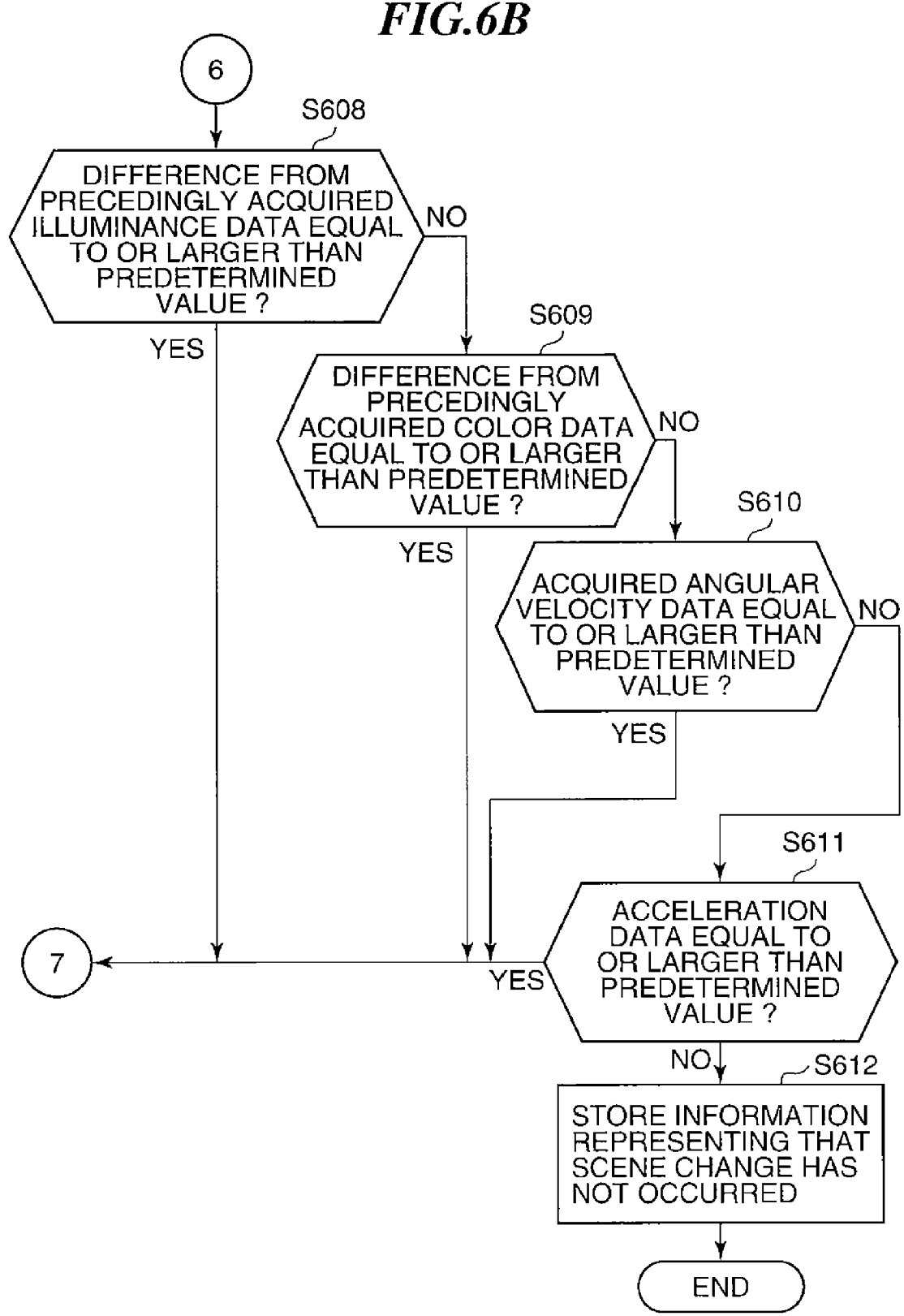

FIGS. 6A and 6B show in flowchart the procedures of the scene-change judgment process performed in steps S415 and S422 in FIG. 4B.

As shown in FIG. 6A, the system controller 50 carries out a face detection process described below (step S600). Next, the system controller 50 acquires illuminance data on a picked-up image from image data on the image (step S601).

Next, the controller 50 acquires color data on the image from the image data (step S602), acquires data representing the angular velocity of the digital camera 100 from the angular velocity sensor 140 (step S603), and acquires data representing the acceleration of the camera 100 from the acceleration sensor 150 (step S604).

Then, the system controller 50 determines whether the number of pieces of acquired data is equal to or greater than two (step S605). If the number of pieces of acquired data is less than two, the controller 50 returns to step S601 to acquire illuminance data on the next image.

If the number of pieces of acquired data is equal to or greater than two, the controller 50 compares a result of current face detection with that of preceding face detection, thereby determining whether the face detection results are different from each other (step S606). Both the detection results are different, if a face has been detected in the preceding face detection but a face has not been detected in the current face detection, and so on.

If there is a difference between both the detection results, the controller 50 causes the system memory 52 to store information representing that a scene change has occurred (step S607). If the result of the current face detection is the same as that of the preceding face detection, the controller 50 determines whether a difference between illuminance data acquired in the current cycle and that acquired in the preceding cycle is equal to or larger than a predetermined value (step S608).

If there is a difference equal to or larger than the predetermined value between these illuminance data, the system controller 50 causes the system memory 52 to store information representing that a scene change has occurred (step S607). If the illuminance data difference is smaller than the predetermined value, the controller 50 determines whether a difference between precedingly acquired color data and currently acquired color data is equal to or larger than a predetermined value (step S609).

If the color data difference is equal to or larger than the predetermined value, the system controller 50 causes the system memory 52 to store information representing that a scene change has occurred (step S607). If the color data difference is less than the predetermined value, the controller 50 determines whether the acquired angular velocity data is equal to larger than a predetermined value (step S610).

If the angular velocity data is equal to or larger than the predetermined value, the system controller 50 causes the system memory 52 to store information representing that a scene change has occurred (step S607). If the angular velocity data is less than the predetermined value, the controller 50 determines whether the acceleration data is equal to or larger than a predetermined value (step S611).

If the acceleration data is equal to larger than the predetermined value, the system controller 50 causes the system memory 52 to store information representing that a scene change has occurred (step S607). If the acceleration data is less than the predetermined value, the system controller 50 causes the memory 52 to store information representing that a scene change has not occurred (step S612).

The predetermined values used for comparison with respective ones of illumination data difference, color data difference, angular velocity data, and acceleration data in the scene-change judgment process are made larger than those used in the scene judgment process. Therefore, a scene change can be prevented from being judged immediately after it is judged in the scene judgment process that the scene has been decided.

(Face Detection Process)

FIG. 7 shows in flowchart the procedures of the face detection process executed in step S513 in FIG. 5B and step S600 in FIG. 6A.

Referring to FIG. 7, the system controller 50 sends image data for face detection from the memory 32 to the image processor 24 (step S701). The image processor 24 applies horizontal bandpass filtering to the image data (step S702), and applies vertical bandpass filtering to the image data (step S703), thereby detecting edge components of the image data. Then, the controller 50 performs pattern matching on the detected edge components (step S704), thereby extracting groups of eye, nose, mouth, and ear candidates.

From the eye candidate group extracted in step S704, the system controller 50 determines, as an eye pair, a couple of candidates that satisfy preset conditions (such as for example, the distance between of two eyes and the inclination thereof), and removes candidates that do not form eye pairs, thereby narrowing down the eye candidate group (step S705).

Next, the system controller 50 associates the narrowed down eye candidate group with other face-forming parts (nose, mouth, ears) corresponding thereto, thereby determining face candidates, and then applies preset non-face condition filtering to the face candidates (step S706) to thereby detect a face. Based on a detection result, the controller 50 outputs face information (step S707), and completes the face detection process.

As described above, by using image data displayed as a through-image, characteristic quantities can be extracted from the image data and object information can be detected. In this embodiment, a case has been described where face information is used as the object information, however, red-eye information or other information can be used as the object information.

(Micro-Scanning Process)

Figure 8:
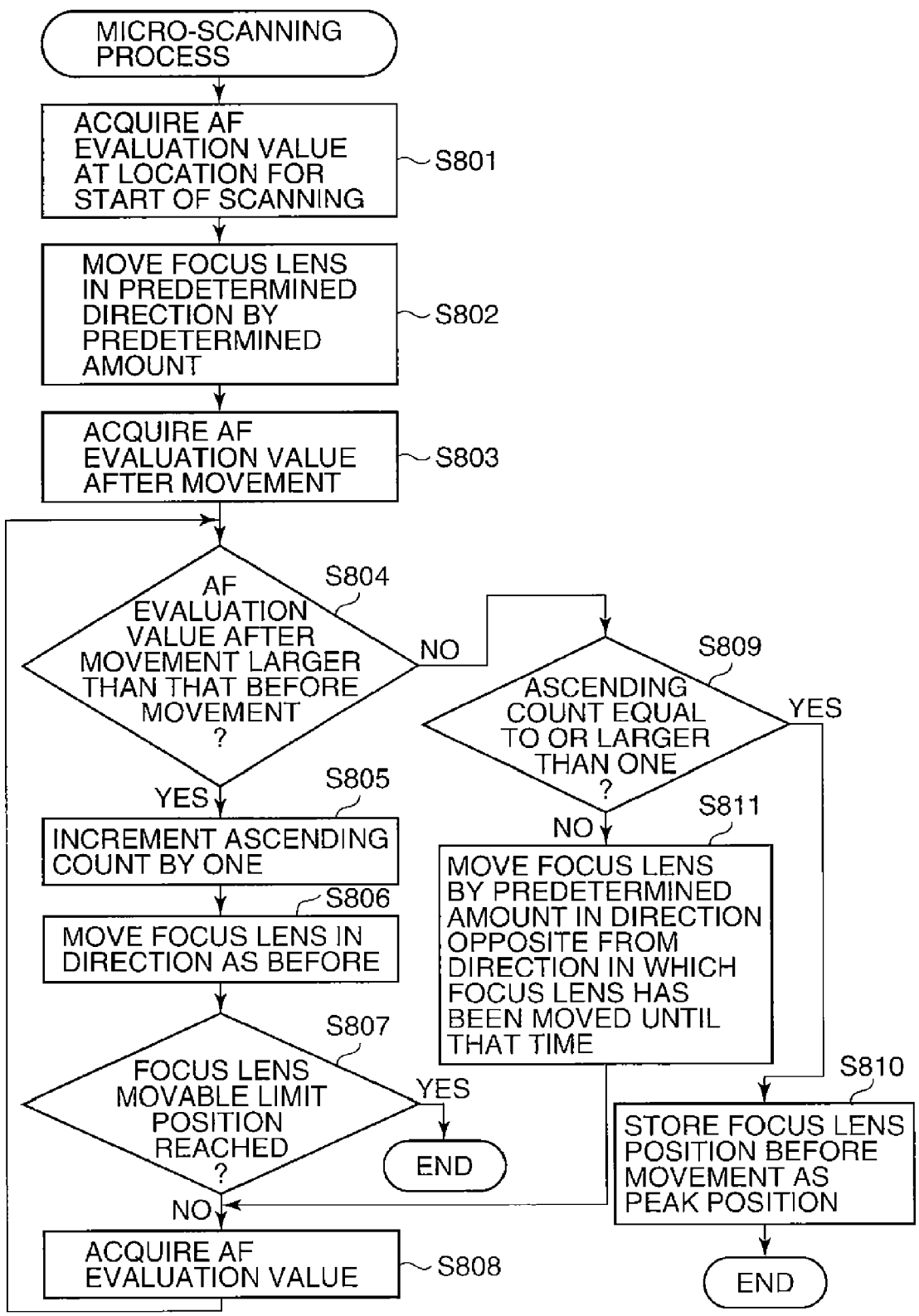
FIG. 8 is a flowchart showing the procedures of a micro-scanning process performed in step S421 in FIG. 4B.

FIG. 8 shows in flowchart the procedures of the micro-scanning process carried out in step S421 in FIG. 4B.

As shown in FIG. 8, the system controller 50 acquires an AF evaluation value at a location where the focus lens is stopped at start of micro-scanning (step S801), and then moves the focus lens in a predetermined direction (e.g., toward the near side) by a predetermined amount (step S802).

Next, the system controller 50 acquires an AF evaluation value at the focus lens position after movement (step S803), and compares the AF evaluation values at the focus lens positions before and after the movement (step S804).

If the AF evaluation value after the focus lens movement is larger than that before the lens movement, the controller 50 increments by one an ascending count which represents that the AF evaluation value has been increasing in an ascending direction (step S805), and moves the focus lens by a predetermined amount in the direction as before (step S806).

Then the controller 50 determines whether the focus lens reaches its movable limit position (step S807).

If the movable limit position of the focus lens is not reached, the controller 50 acquires an AF evaluation value at that focus lens position (step S808), and returns to step S804. If the focus lens reaches its movable limit position, the micro-scanning process is completed.

If it is determined in step S804 that the AF evaluation value after the focus lens movement is smaller than that after the movement, the system controller 50 determines whether the ascending count is equal to or larger than one (step S809).

If the ascending count is equal to or greater than one, the controller 50 stores the focus lens position before the lens movement as a peak position (step S810), and completes the micro-scanning process.

If the ascending count is equal to zero, the system controller 50 moves the focus lens by a predetermined amount in a direction (e.g., toward the tele side) opposite from a direction (e.g., toward the near side) in which the focus lens has been moved until that time (step S811).

Then, the controller 50 acquires an AF evaluation value at that focus lens position (step S808), and returns to step S804.

It is to be understood that the present invention may also be accomplished by supplying a system or an apparatus with a storage medium in which a program code of software, which realizes the functions of the above described embodiment is stored and by causing a computer (or CPU or MPU) of the system or apparatus to read out and execute the program code stored in the storage medium.

In that case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, and a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code readout from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-230895, filed Sep. 9, 2008, which is hereby incorporated by reference herein in its entirety.

What is claimed is:

1. An image pickup apparatus comprising:
   an image pickup unit adapted to acquire an image by photoelectric conversion of an object image formed by a focus lens;
   a focus detection unit adapted to detect an in-focus state of an image while moving the focus lens; and
   an object detection unit adapted to detect, from an image, an object to be focused, wherein said focus detection unit is adapted to move the focus lens to a predetermined position in a case that a change of data between data from a precedingly acquired image and data from the image is detected, wherein said focus detection unit is adapted to detect an in-focus state while moving the focus lens in a case that the change of data is not detected, and wherein in-focus state detection performed in a case that the change is not detected is carried out after the focus lens is moved to a detected position corresponding to a detected object in a case that the object has been detected by said object detection unit, whereas the in-focus state detection is carried out from the position in a case that an object has not been detected by said object detection unit.

2. The image pickup apparatus according to claim 1, wherein in-focus state detection is performed by said focus detection unit in a case that the change of data is larger than a predetermined value.

3. The image pickup apparatus according to claim 1, wherein in-focus state detection is performed by said focus detection unit in a case that the change of data is a first value, and in-focus state detection is not performed by said focus detection unit in a case that the change of data is a second value which is less than the first value.

4. The image pickup apparatus according to claim 1, wherein after said focus detection unit moves the focus lens to the predetermined position in the case that the change of data is detected, said focus detection unit keeps the focus lens at the predetermined position until the change of data is not detected.

5. The image pickup apparatus according to claim 1 wherein said focus detection unit is adapted to detect at least one of luminance and color of the acquired image.

6. The image pickup apparatus according to claim 1, wherein a threshold value for use to detect the change of data is different from a threshold value for use to determine that the change of data has been not detected.

7. The image pickup apparatus according to claim 1, wherein an aperture is reduced at a position of the focus lens.

8. The image pickup apparatus according to claim 1, further comprising:
a state detection unit adapted to detect angular velocity data representing an angular velocity of the image pickup apparatus, and
wherein said focus detection unit is adapted to move the focus lens to a position in a case that said state detection unit detects the angular velocity data is larger than a predetermined value, and
wherein said focus detection unit is adapted to detect an in-focus state while moving the focus lens in a case that said state detection unit detects the angular velocity data is less than a predetermined value.

9. The image pickup apparatus according to claim 1, further comprising:
a state detection unit adapted to detect acceleration data representing an acceleration of the image pickup apparatus, and
wherein said focus detection unit is adapted to move the focus lens to a position in a case that said state detection unit detects the acceleration data is larger than a predetermined value, and
wherein said focus detection unit is adapted to detect an in-focus state while moving the focus lens in a case that said state detection unit detects the acceleration data is less than a predetermined value.

10. A control method for an image pickup apparatus, comprising:
an image pickup step of acquiring an image by photoelectric conversion of an object image formed by a focus lens;
a focus detection step of detecting an in-focus state of an image while moving the focus lens in an optical axis direction; and
an object detection step of detecting, from an image, an object to be focused,
wherein the focus lens is moved to a predetermined position in said focus detection step in a case that a change of data between data from a precedingly acquired image and data from the image is detected,
wherein an in-focus state is detected while moving the focus lens in said focus detection step in a case that the change of data is not detected, and
wherein in-focus state detection performed in a case that the change is not detected is carried out after the focus lens is moved to a detected position corresponding to a detected object in a case that the object has been detected by said object detection step, whereas the in-focus state detection is carried out from the position in a case that an object has not been detected by said object detection step.

11. A non-transitory computer-readable storage medium storing a program for causing a computer to execute a control method for an image pickup apparatus, the control method comprising:
an image pickup step of acquiring an image by photoelectric conversion of an object image formed by a focus lens;
a focus detection step of detecting an in-focus state of an image while moving the focus lens in an optical axis direction; and
an object detection step of detecting, from an image, an object to be focused,
wherein the focus lens is moved to a predetermined position in said focus detection step in a case that a change of data between data from a precedingly acquired image and data from the image is detected,
wherein an in-focus state is detected while moving the focus lens in said focus detection step in a case that the change of data is not detected, and
wherein in-focus state detection performed in a case that the change is not detected is carried out after the focus lens is moved to a detected position corresponding to a detected object in a case that the object has been detected by said object detection step, whereas the in-focus state detection is carried out from the position in a case that an object has not been detected by said object detection step.

12. An image pickup apparatus comprising:
an image pickup unit adapted to acquire an image by photoelectric conversion of an object image formed by a focus lens;
a focus detection unit adapted to detect an in-focus state of an image while moving the focus lens in an optical axis direction; and
a state detection unit adapted to detect angular velocity data representing an angular velocity of the image pickup apparatus,
wherein said focus detection unit is adapted to move the focus lens to a position in a case that said state detection unit detects the angular velocity data is larger than a predetermined value, and wherein said focus detection unit is adapted to detect an in-focus state while moving the focus lens in a case that said state detection unit detects the angular velocity data is less than a predetermined value.

13. The image pickup apparatus according to claim 12, wherein said focus detection unit is adapted to detect an in-focus state of the image while moving the focus lens within a range from the position in a case that said state detection unit detects the angular velocity data is larger than a predetermined value, wherein said focus detection unit is adapted to detect an in-focus state of the image while moving the focus lens such that a focus evaluation value of the image acquired by the image pickup unit becomes greater in a case that said state detection unit detects the angular velocity data is less than a predetermined value.

14. The image pickup apparatus according to claim 12, wherein said state detection unit adapted to detect acceleration data representing an acceleration of the image pickup apparatus, wherein said focus detection unit is adapted to move the focus lens to a position in a case that said state detection unit detects the acceleration data is larger than a predetermined value, and wherein said focus detection unit is adapted to detect an in-focus state while moving the focus lens in a case that said state detection unit detects the acceleration data is less than a predetermined value.

15. The image pickup apparatus according to claim 12, wherein said focus detection unit is adapted to move the focus lens to a position in a case that a change of data between data from a precedingly acquired image and data from the image is detected, wherein said focus detection unit is adapted to detect an in-focus state while moving the focus lens in a case that the change of data is not detected.

16. The image pickup apparatus according to claim 14, further comprising;

an object detection unit adapted to detect, from an image, an object to be focused, and wherein in-focus state detection performed in a case that the change is not detected is carried out after the focus lens is moved to a detected position corresponding to a detected object in a case that the object has been detected by said object detection unit, whereas the in-focus state detection is carried out from the position in a case that an object has not been detected by said object detection unit.

17. The image pickup apparatus according to claim 15, wherein a threshold value for use to detect the change of data is different from a threshold value for use to determine that the change of data has been not detected.

18. The image pickup apparatus according to claim 12, wherein said focus detection unit is adapted to move the focus lens to a position in a case that said state detection unit detects the angular velocity data is larger than a first value, and wherein said focus detection unit is adapted to detect an in-focus state while moving the focus lens in a case that said state detection unit detects the angular velocity data is less than a second value which is less than the first value.

19. An image pickup apparatus comprising:

an image pickup unit adapted to acquire an image by photoelectric conversion of an object image formed by a focus lens;

a focus detection unit adapted to detect an in-focus state of the image while moving the focus lens; and a state detection unit adapted to detect acceleration data representing an acceleration of the image pickup apparatus, wherein said focus detection unit is adapted to move the focus lens to a position in a case that said state detection unit detects the acceleration data is larger than a predetermined value, and wherein said focus detection unit is adapted to detect an in-focus state while moving the focus lens in a case that said state detection unit detects the acceleration data is less than a predetermined value.

20. The image pickup apparatus according to claim 19, wherein said state detection unit adapted to detect acceleration data representing an acceleration of the image pickup apparatus, wherein said focus detection unit is adapted to move the focus lens to a position in a case that said state detection unit detects the angular velocity data is larger than a predetermined value, and wherein said focus detection unit is adapted to detect an in-focus state while moving the focus lens in a case that said state detection unit detects the angular velocity data is less than a predetermined value.

21. The image pickup apparatus according to claim 19, wherein said focus detection unit is adapted to move the focus lens to a position in a case that a change of data between data from a precedingly acquired image and data from the image is detected, wherein said focus detection unit is adapted to detect an in-focus state while moving the focus lens in a case that the change of data is not detected.

22. The image pickup apparatus according to claim 20, further comprising;

an object detection unit adapted to detect, from an image, an object to be focused, and wherein in-focus state detection performed in a case that the change is not detected is carried out after the focus lens is moved to a detected position corresponding to a detected object in a case that the object has been detected by said object detection unit, whereas the in-focus state detection is carried out from the position in a case that an object has not been detected by said object detection unit.

23. The image pickup apparatus according to claim 21, wherein a threshold value for use to detect the change of data is different from a threshold value for use to determine that the change of data has been not detected.

24. The image pickup apparatus according to claim 19, wherein said focus detection unit is adapted to move the focus lens to a position in a case that said state detection unit detects the acceleration data is larger than a first value, and wherein said focus detection unit is adapted to detect an in-focus state while moving the focus lens in a case that said state detection unit detects the acceleration data is less than a second value which is less than the first value.

25. A control method for an image pickup apparatus, comprising:

an image pickup step of acquiring an image by photoelectric conversion of an object image formed by a focus lens;

a focus detection step of detecting an in-focus state of the image while moving the focus lens in an optical axis direction; and a state detection step of detecting angular velocity data representing an angular velocity of the image pickup apparatus, wherein the focus lens is moved to a position in said focus detection step in a case that the angular velocity data is larger than a predetermined value in said state detection step, and wherein an in-focus state is detected while moving the focus lens in said focus detection step in a case that the angular velocity data is less than a predetermined value in said state detection step.

26. A control method for an image pickup apparatus, comprising:

an image pickup step of acquiring an image by photoelectric conversion of an object image formed by a focus lens;

a focus detection step of detecting an in-focus state of the image while moving the focus lens in an optical axis direction; and a state detection step of detecting acceleration data representing an acceleration of the image pickup apparatus, wherein the focus lens is moved to a position in said focus detection step in a case that the acceleration data is larger than a predetermined value in said state detection step, and wherein an in-focus state is detected while moving the focus lens in said focus detection step in a case that the acceleration data is less than a predetermined value in said state detection step.

27. A non-transitory computer-readable storage medium storing a program for causing a computer to execute a control method for an image pickup apparatus, the control method comprising:

an image pickup step of acquiring an image by photoelectric conversion of an object image formed by a focus lens;

a focus detection step of detecting an in-focus state of the image while moving the focus lens in an optical axis direction; and a state detection step of detecting angular velocity data representing an angular velocity of the image pickup apparatus, wherein the focus lens is moved to a position in said focus detection step in a case that the angular velocity data is larger than a predetermined value in said state detection step, and wherein an in-focus state is detected while moving the focus lens in said focus detection step in a case that the angular velocity data is less than a predetermined value in said state detection step.

28. A non-transitory computer-readable storage medium storing a program for causing a computer to execute a control method for an image pickup apparatus, the control method comprising:

an image pickup step of acquiring an image by photoelectric conversion of an object image formed by a focus lens;

a focus detection step of detecting an in-focus state of the image while moving the focus lens in an optical axis direction; and a state detection step of detecting acceleration data representing an acceleration of the image pickup apparatus, wherein the focus lens is moved to a position in said focus detection step in a case that the acceleration data is larger than a predetermined value in said state detection step, and wherein an in-focus state is detected while moving the focus lens in said focus detection step in a case that the acceleration data is less than a predetermined value in said state detection step.

29. An image pickup apparatus comprising:

an image pickup unit adapted to acquire an image by photoelectric conversion of an object image formed by a focus lens;

a focus detection unit adapted to detect an in-focus state of the image while moving the focus lens; and wherein said focus detection unit is adapted to move the focus lens to a position in a case that a change of data between data from a precedingly acquired image and data from the image is detected, and detect an in-focus state of the image while moving the focus lens within a range from the position, and wherein said focus detection unit is adapted to detect the in-focus state of the image while moving the focus lens such that a focus evaluation value of the image acquired in series by the image pickup unit becomes greater in a case that the change of data is not detected.

* * * * *